United States Statutory Invention Registration [19]

[11] Reg. Number: H687

Marrs [43] Published: Oct. 3, 1989

[54] VIDEO MICROIMAGING SYSTEM

[75] Inventor: C. Denton Marrs, Ridgecrest, Calif.

[73] Assignee: The United States of America as represented by the Secretary of the Navy, Washington, D.C.

[21] Appl. No.: 341,599

[22] Filed: Apr. 17, 1989

[51] Int. Cl.[4] ..... G01N 21/32; G01B 11/26

[52] U.S. Cl. ..... 356/237; 356/153

[56] References Cited

U.S. PATENT DOCUMENTS

| | | | |
|---|---|---|---|
| 3,752,587 | 8/1973 | Meyers et al. | 356/153 |
| 3,769,963 | 11/1973 | Goldman et al. | 128/2 R |
| 3,909,131 | 9/1989 | Waters | 356/3 |
| 4,319,839 | 3/1982 | Durran | 356/153 |
| 4,330,208 | 5/1982 | Eloy | 356/318 |
| 4,389,669 | 6/1983 | Epstein et al. | 358/101 |

*Primary Examiner*—Thomas H. Tarcza
*Assistant Examiner*—Linda J. Wallace
*Attorney, Agent, or Firm*—William C. Townsend; Melvin J. Sliwka; Stephen J. Church

[57] ABSTRACT

An apparatus for observing defects in and evolution of induced damage on a test surface is created by combining an illumination system with a magnification system. A visible light source is used to illuminate the surface of an optical sample. A test laser system is aligned to illuminate the identical surface areas of the optical sample with light of preselected wavelength (frequency) and intensity. A telescope is focused on the illuminated surface area. The output image of the telescope is fed to a video camera system which in turn is connected to a video tape system.

4 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

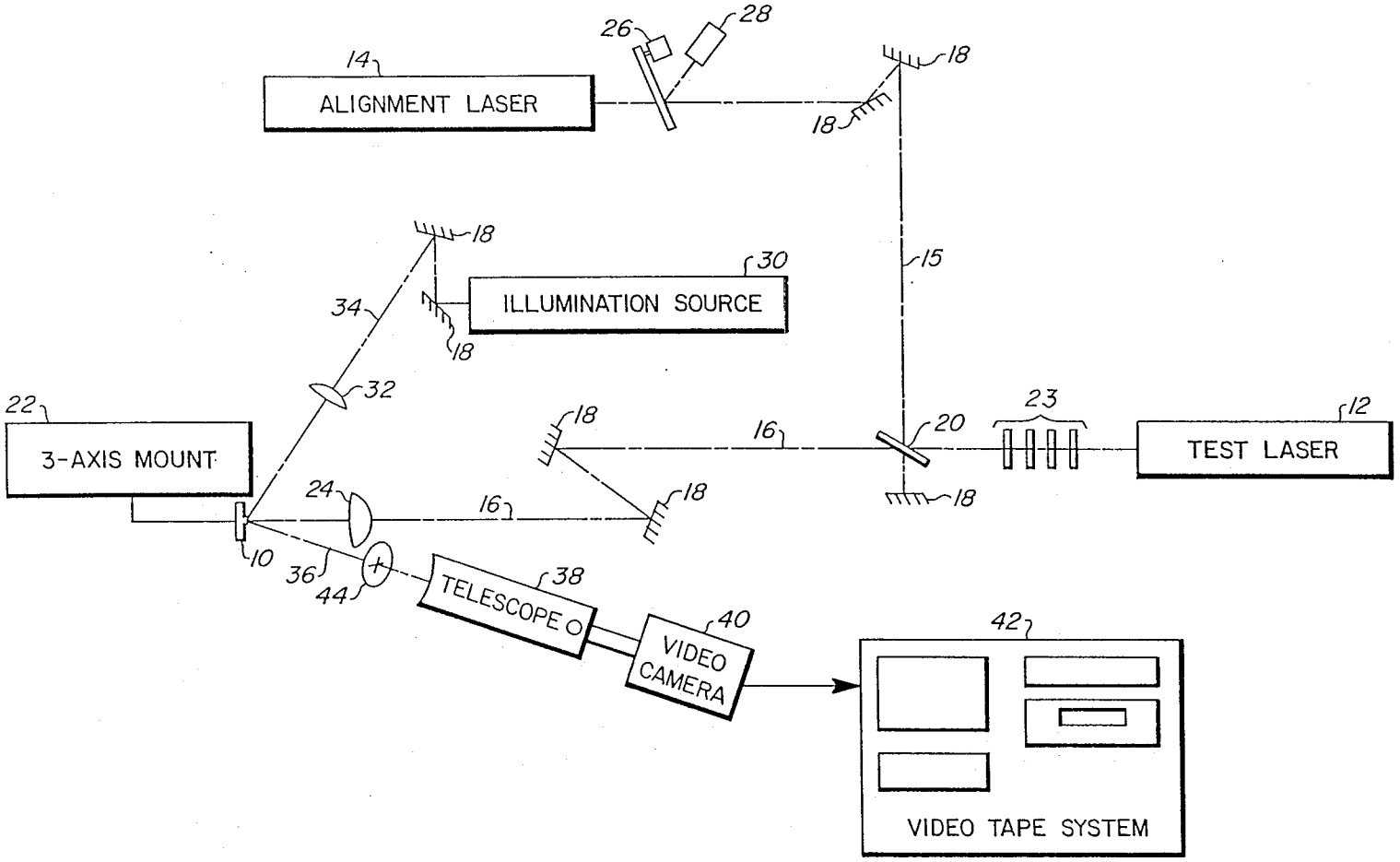
TEST LASER
12
23
20
18
15
16
ALIGNMENT LASER
14
26
28
ILLUMINATION SOURCE
30
34
32
24
36
44
10
3-AXIS MOUNT
22
TELESCOPE
38
VIDEO CAMERA
40
VIDEO TAPE SYSTEM
42

VIDEO MICROIMAGING SYSTEM

REFERENCE TO RELATED APPLICATION

This application is a substitute for application 06/607,870 filed May 7, 1984 and now abandoned.

BACKGROUND OF THE INVENTION

1. Field of Invention

This invention relates to apparatus for observing defects in optical surfaces and components. In particular, this invention relates to observation of defects in optical components and the evaluation of the laser induced damage of these defects.

2. Descriptions of the Prior Art

Previous testing methods required destructive testing. No previous testing apparatus permitted observation of the potential damage progression of the initiation defects and the destruction process. Evaluations were based on the amount of destruction that occurred. The effect of laser illumination up to the start of destruction was never observed.

SUMMARY OF THE INVENTION

A sample is placed in a three-axes mount. A portion of the surface area is illuminated by a visible light source whose intensity is below the damage threshold. The identical portion of surface area is also illuminated by a test laser system at a desired wavelength and intensity. An alignment laser system is used to align the test laser. A telescope is focused on the doubly illuminated surface area to observe the potential damage-defect locations when the surface area is illuminated by the test laser system. This also allows observation of the evaluation of the laser induced damage. The telescope is connected to a video camera which in turn is connected to a video tape system. The video tape system permits recordation of the surface area and can include a slow motion playback to observe detail changes.

BRIEF DESCRIPTION OF THE DRAWINGS

The FIGURE is a block diagram of the present invention.

DETAILED DESCRIPTION

The FIGURE shows a detailed version of the present invention. An optical sample 10 is to be tested for susceptibility to damage from a test laser system 12. An alignment laser 14 provides low intensity light to align test laser system 12. The phrase "laser system" is used to include all components necessary to emit a beam of coherent light. Light of preselected wavelength and intensity from test laser system 12 is directed along an optical path, represented by dashed line 16, until the light is incident on sample 10. A plurality of mirrors 18 are used to direct optical path 16. A beamsplitter 20 is used to permit test laser system 12 and alignment laser system 14 to be colinear between sample 10 and beamsplitter 20. Light from test laser system 12 strikes sample 10 at any desired angle of incidence. Light in optical path 16 may be focused by lens 24. Test laser system 12 is shown emitting light through bulk attenuators 23 which limit the amount of energy of test laser system 12 on sample 10.

Alignment laser system 14 may be a continuous wave, CW, laser, such as an argon laser. Test laser system 12 will usually be a pulsed laser with relatively high peak power per pulse. Since the two laser systems are colinear from beamsplitter 20, beamsplitter 20 will reflect part of the light from test laser system 12 along optical path 15, which is the optical path from beamsplitter 20 to alignment laser system 14. After alignment, alignment laser system 14 is turned off. A shutter mirror 26 is then switched across optical path 15 as shown. Light is reflected from the mirror portion to a photodiode 28 which measures the energy emitted by test laser system 12. Any photodiode may be used. A fast photodiode permits measurement of both energy and the temporal waveform of pulses if a pulsed laser is being used. For a CW laser to serve as the test laser system, it must have a large average power to illuminate the defects. The test laser may be any pulsed or CW laser. The laser to serve as the test laser is chosen by the wavelength, pulse length, and intensity for a pulsed laser and by wavelength and intensity for CW.

An illumination source 30 is used to illuminate the identical surface being irradiated by test laser system 12 with visible light. Illumination source 30 may be a noncoherent source or a laser that emits visible light. Mirrors 18 and a focusing optic 32 may be used to control an optical path for visible light 34. There is always some light which is scattered in directions other than specular. This random scatter light is caused by defects in the optical surface which cause small irregular scattering sites.

This random scatter along a direction 36 is observed to determine size, position of defects and damage evolution. The light scattered along direction 36 is observed by a short focal length telescope 38. The output of telescope 38 is fed to a video camera 40, which in turn is connected to a video tape system 42. The test laser system, illumination source and supporting optical components form a laser alignment and focusing checking system.

If test laser system 12 is operating with visible light, illumination source 30 may be turned off since test laser system 12 will provide its own scattered visible light for background illumination. The angular difference between direction 36 and specular reflection should be large enough to assure optical isolation. A nominal difference of 15° is usually sufficient. When test laser system 12 is off and sample 10 is lighted by the illumination source, the video camera 40 will see the surface of sample 10. When test laser system 12 is on, the surface shows a random pattern of bright spots. The bright spots correspond to defects on the surface or in the optical coatings on sample 10. The entire surface of sample 10 may be scanned by moving sample 10 by three-axes translation mount 22. Each bright spot is a potential failure location for laser induced damage. As the intensity of the light from test laser system 12 increases, some of the bright spots will start to grow in brightness and/or size. By placing a polarizer 44 in front of telescope 38, different polarizations will show different bright spots. Changing the wavelength of test laser system 12 will also change the observed pattern of bright spots. These factors may be used to determine depth of the defect from the surface. Test laser system 12 should be chosen for the same characteristics that sample 10 has been designed to be used at. Testing outside the operating range of sample 10 will not identify the defects that will fail when used within the designed operating range. Test laser system 12 does not have to emit visible light for bright spots to be observed. As long as video camera 40 has a range that includes the wavelength emitted by the test laser, the bright spots are observed. By including a slow motion playback feature in video tape system 42, the evolution of damage of the defect may be observed in great detail.

It is obvious to those skilled in the art that numerous modifications to the above may be made within the scope of the following claims.

What is claimed is:

1. A video microimaging system for detecting and recording optical surface defects on an optical sample comprising:

a laser alignment and focus checking system for aligning and focusing a test laser on a predetermined portion of the surface area of an optical sample;

a telescope isolated from specularly reflected light from said optical sample and aligned to receive non-specular light reflected from said predetermined portion of said optical sample and to produce a magnified image of said predetermined portion of said optical sample;

a video camera aligned to receive the magnified image of said telescope; and a video recording system electrically connected to said video camera for recording the image of said optical sample received by said video camera for later viewing by an observer.

2. A non-destructive testing method for detecting and observing sites of optical surface defect in an optical element, comprising the steps of:

illuminating an optical sample by means of a coherent source at an intensity which is below the damage threshold for the optical sample being tested;

collecting non-specular light, reflected in a predetermined direction from said optical sample, in a short focal length telescope which produces a magnified image of said optical sample;

recording the magnified image provided by said short focal length telescope; and reproducing the recorded image for viewing by an observer, wherein sites of optical defect will appear as bright spots on the surface of the optical sample.

3. The combination comprising:

an optical sample having a surface portion bearing a defect site which shows as a bright spot by illuminating light scattered from the site in a non-specular direction and at which site damage is induced by laser light of predetermined wavelength and intensity;

means for illuminating said surface portion with such illuminating light and such laser light; and observation means for collecting such illuminating light scattered from said site in a predetermined direction which assures optical isolation between specular reflection from said surface portion and illuminating light scattered by the defect site and for producing images of said surface portion with said spot to use in evaluating said induced damage.

4. The combination of claim 3 further ccomprising video means connected to the observation means for recording successive such images to use in evaluating the evolution of said damage.

* * * * *